May 3, 1966  J. L. HAYDU ETAL  3,249,716
TIME DELAY DEVICE
Filed Dec. 26, 1963  9 Sheets-Sheet 1

INVENTORS
JOHN L. HAYDU
LELAND E. LAWRENCE
DONALD V. ZUNFT

BY
Arnold J. Ericsen

ATTORNEY

Fig.4

May 3, 1966  J. L. HAYDU ETAL  3,249,716
TIME DELAY DEVICE
Filed Dec. 26, 1963  9 Sheets-Sheet 3

INVENTORS
JOHN L. HAYDU
LELAND E. LAWRENCE
DONALD V. ZUNFT

BY

ATTORNEY

INVENTORS
JOHN L. HAYDU
LELAND E. LAWRENCE
DONALD V. ZUNFT

ATTORNEY

May 3, 1966 J. L. HAYDU ETAL 3,249,716
TIME DELAY DEVICE
Filed Dec. 26, 1963 9 Sheets-Sheet 5

INVENTORS
JOHN L. HAYDU
LELAND E. LAWRENCE
DONALD V. ZUNFT
BY
ATTORNEY

INVENTORS
JOHN L. HAYDU
LELAND E. LAWRENCE
DONALD V. ZUNFT

ATTORNEY

May 3, 1966  J. L. HAYDU ETAL  3,249,716
TIME DELAY DEVICE
Filed Dec. 26, 1963  9 Sheets-Sheet 7

INVENTORS
JOHN L. HAYDU
LELAND E. LAWRENCE
DONALD V. ZUNFT

BY

ATTORNEY

May 3, 1966    J. L. HAYDU ETAL    3,249,716
TIME DELAY DEVICE

Filed Dec. 26, 1963    9 Sheets-Sheet 8

INVENTORS
JOHN L. HAYDU
LELAND E. LAWRENCE
DONALD V. ZUNFT

BY *Arnold J. Ericsen*

ATTORNEY

May 3, 1966 J. L. HAYDU ETAL 3,249,716
TIME DELAY DEVICE
Filed Dec. 26, 1963 9 Sheets-Sheet 9

INVENTORS
JOHN L. HAYDU
LELAND E. LAWRENCE
DONALD V. ZUNFT

BY

ATTORNEY

United States Patent Office 3,249,716
Patented May 3, 1966

1

3,249,716
TIME DELAY DEVICE
John L. Haydu, Milwaukee, Leland E. Lawrence, Wauwatosa, and Donald V. Zunft, Greendale, Wis., assignors to Allen-Bradley Company, Milwaukee, Wis., a corporation of Wisconsin
Filed Dec. 26, 1963, Ser. No. 333,318
6 Claims. (Cl. 200—97)

The present invention relates to improvements in timing relays, and in particular to a pneumatically operated timing mechanism functioning in conjunction with an electro-magnetic operating device. The timing relay of this invention is arranged so as to provide a unitary combination which may be combined with a unit including instantaneously operated relay contacts, in addition to providing time delay contacts which may be operated in either "On" or "Off" delay operation conjointly with the operating of the instantaneous contacts. The timer mechanism, including its delay operation contacts, may also be operated directly from the electromagnet operator, with the instantaneous contact unit being removed, and without requiring any adjustment of the magnet assembly or contact springs because of the unique manner of operation of the relay construction. Another feature of the invention provides convertibility of the respective contacts of both the time delay mechanism and of the instantaneous contact portion for readily converting them from a normally-closed position to a normally-open position or vice versa.

Accordingly, it is a principal object of the present invention to provide a relay constructed in such manner as to provide separate units operated from a single electromagnetic actuator, which units may be combined to provide both time delay contacts and instantaneously operated, or which units may be separated for independent operation by means of said actuator without requiring any modification whatsoever of either the contact units or the actuator.

It is another object of the present invention to provide a pneumatic timer actuated from its normal or rest position to its operating position by means of an electromagnet and which mechanism includes a plurality of contact modules or assemblies which are arranged for normally-closed or normally-open positioning by mere inversion thereof, and further which timing mechanism includes operating elements arranged to alternately provide "On Delay" or "Off Delay" control by simple removal of a portion thereof and turning it end-for-end to obtain either of the delay functions.

It is a further object of the present invention to provide a timer relay which includes contacts operated by means of a "trigger" action as opposed to conventional "snap action" contacts which require specially designed switches of the precision type, and which timer mechanism of the present invention permits a relatively simplified construction compared to that required for operating timer contacts made heretofore.

It is still another object of the present invention to provide a timer relay of rugged contact construction and wherein the contacts of which are operated from either a normally-open or normally-closed position to operating position by a lever controlled actuator, which actuator is permitted to operate upon release of cooperating latching levers, these levers, in turn, being operated through the medium of a pneumatic expandable, contractible diaphragm, such as a bellows, and which diaphragm is set into action responsive to movement of an electromagnetically operated actuator.

It is a still further object of the present invention to provide a valve housing for a diaphragm which includes a thumb wheel operated needle valve for adjustment

2 thereof to permit entrance of air at a preselected rate for controlling the expansion of the diaphragm bellows, and which valve housing is of a unitary design including the bellows and the adjustable needle valve, along with a hold-down bracket for alternatively controlling latching levers to provide either an "On Delay" operation, depending upon the relative end-for-end positioning of the valve housing with respect to the cooperating timer contact mechanism.

Still another object of this invention is to minimize the number of parts usually found in timer relays and to facilitate the assembly of the component elements of a timer relay to obtain a compact device of neat appearance and one which may be operated in any desired position relative to the vertical.

It is a still further object of the present invention to provide a timer relay adaptable for "On Delay" or "Off Delay" operation, wherein either of said operations may be obtained without dismantling the entire unit, and likewise to provide a timer relay wherein the contacts thereof may be removed from the unit without disturbing other operating components for inversion thereof to obtain either a normally-open or a normally-closed arrangement.

The foregoing objects and advantages of this invention will appear from the description to follow. In the description references made to accompanying drawings which form a part hereof and which there is shown by way of illustration specific embodiments of the invention. These embodiments will be described in sufficient detail to enable those skilled in the art to practice this invention. The invention may also reside in other embodiments in various modifications and rearrangements, as may occur to one practicing the art. Consequently, the following detailed description is not to be taken in a limiting sense; instead the scope of the invention is best defined by the claims at the end of the specification.

Referring now to the drawings.

Figure 1:
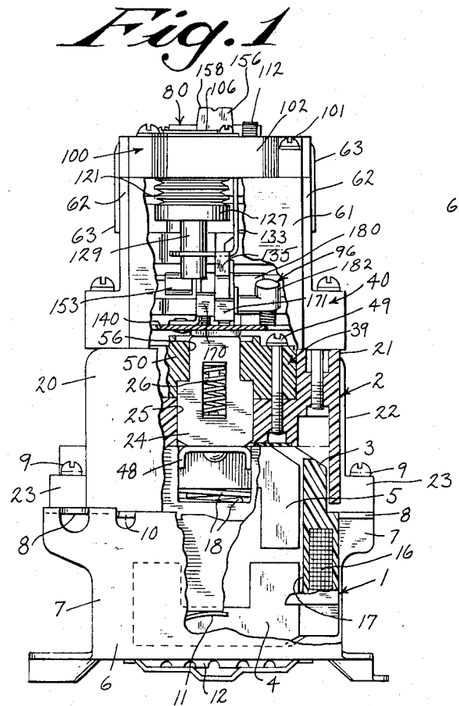
FIG. 1 is a side view in elevation of a relay of the present invention and illustrating an embodiment wherein both time delay contacts and instantaneously operated contacts are provided, and with portions of the side wall of the operating units thereof broken away to better illustrate the interior thereof.
Figure 19:
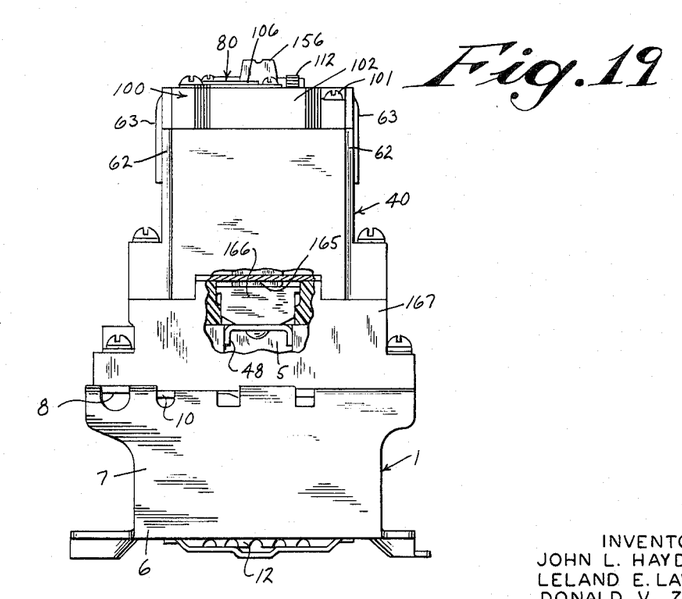
FIG. 19 is a side view in elevation of another embodiment of the relay of the present invention, in which the timer unit is directly attached to the magnet frame by means of a molded base support which support has been substituted for the intermediate unit of FIGS. 1 and 2 containing the instantaneously operated contacts.

The general arrangement of the relay shown on the drawings is depicted in the embodiments of FIGS. 1 and 19. The embodiment of FIG. 1 is illustrative of the timing relay in combination with a block of instantaneous contacts, whereas FIG. 19 illustrates the timing relay with its time delay contacts operated directly by the electromagnet assembly generally depicted in both figures by the reference numeral 1. The instantaneous contact housing 2 (see FIGS. 1 and 2) and the magnet assembly 1 have been described and claimed in detail in the co-pending application of Leland E. Lawrence and John L. Haydu, Serial No. 333,596 filed on December 26, 1963 for Electromagnetic Relay. Accordingly, no detailed explanation of the various components comprising the magnet frame and the contact housing will be needed other than to identify the elements cooperating with one another to provide the desired operational characteristics. For instance, the contact housing 2 supports the stationary and instantaneously movable contacts of the relay and further provides readily accessible terminals for conveniently wiring the relay into a circuit. The relay of the present invention provides a convenient structure permitting a so-called "trigger" operated time delay lever assembly, which has decided advantages over the well known "snap-action" switches which are usually positioned adjoining the operating device and are of a "precision" nature requiring relatively complicated manufacturing techniques.

Figure 2:
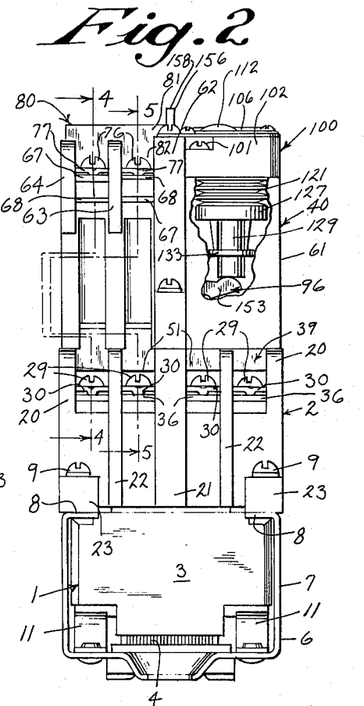
FIG. 2 is a side view in elevation of the relay of FIG. 1 and taken at the lefthand side of FIG. 1 with parts broken away to provide a better view of the interior of the bellows mechanism.

In the embodiment of FIGS. 1 and 2, the magnet assembly 1 includes an operating coil block 3 and magnetic components comprising a yoke 4 and an armature 5 mounted in a base frame 6. The base frame 6 is of a channel-like configuration, with the upper margins of the side walls being bent inwardly to provide ledges 8 serving to support the instantaneous contact housing 2 mounted by means of screws 9 engaging tapped holes in the inturned ledges 8. Intermediate the inturned ledges 8, the side wall 7 of the base frame are each lanced to permit the forming of inturned ledges 10 at either side thereof which cooperate with curved springs 11 mounted at the floor of the base frame 6 to retain the coil block 3 therebetween. The springs are compressible, and as explained in the above-mentioned co-pending application, the coil block and attached yoke 4 may be removed by pressing the coil block 3 downwardly at the left side of FIG. 1 so as to release the block from retaining stops (not shown) to permit the block to be pushed outwardly of the base frame for replacement or substitution of a new coil when and if desired. Disposed in the floor of the magnet frame 6 is a resilient shock absorbing construction consisting of a resilient rubber cushion 12. This shock absorbing construction functions to receive and engage the lower face of the magnet yoke 4, so as to absorb shock impact delivered to the yoke in operation of the magnet.

The relay construction as described in the co-pending application comprises the aforementioned yoke 4 and armature 5, such that the armature 5 is normally positioned to hold instantaneous contacts in what may be determined their normal positions. Such normal positions for the contacts may be either normally-closed or normally-open, and the term "normal" pertains primarily to the condition of a contact when a relay is unenergized. Thus, upon energization of the operating coil, the armature will be moved so that the operating springs for the individual contacts can urge the contacts into their operated position. Such an operation is quite normal for relay structures and the position retention of the contacts in either the normal or operated positions, by either the force of the armature or that of an actuated spring is desirable, so that gravity forces are not relied upon in the operation of the device. This permits the relay to be mounted in any of several positions and while the relay embodiments of the drawings are indicated in an upright or vertical position, it may be quite normal to mount the relay in a horizontal position.

The coil block 3 is of a molded resin construction and has an intricate configuration that permits the block to have several functions. These functions are, primarily to interfit with the base frame 6 in tightly held engagement therewith without assembly screws or the like, to present support for guiding the movable armature 5, to provide a receptacle for the magnetic yoke 4 for accurately positioning the yoke 4 in place, to house coil windings which provide the magnetic flux for operating the magnet, and to provide a single vehicle for inserting and removing the entire electromagnetic components in and from the relay.

Both the yoke 4 and the movable armature 5 are of U-shaped construction. The armature 5 moves downwardly into engagement with the yoke legs upon energization of the coils 16 of the coil block 3. The yoke 4 is seated within spaced apart windows 17 of the coil block 3. The windows 17 define a cross-bar (not shown) formed in the coil block 3. The coils 16 are wound into two sections and are serially connected and embedded in the molded plastic block 3. The cross-bar is provided with a spring seat formed therein (not shown) and a pair of concentric springs 18 are disposed between the spring seat and the underside of the movable armature 5. Thus, the springs 18 work against the underside of the armature 5 to move it into an upper position (with relation to FIG. 1), away from the yoke 4 when the coils 16 are de-energized. It will be noted that one spring of the springs 18 is a righthand spring, and the other is a lefthand spring so that torque due to spring movements which are applied to the armature 5 are sufficiently neutralized.

Thus, it will be apparent that the springs 18 normally hold the yoke 4 and armature 5 apart from one another and these magnetic members are drawn towards one another upon energization of the coils 16.

Instantaneous contact housing

The contact housing 2 containing the instantaneously operating contacts is arranged for use with the timing contacts as shown in the construction of FIGS. 1 and 2, or may be removed, as shown in FIG. 19, depending upon the ultimate application of the relay. With reference to FIGS. 1 and 2, it will be apparent that the housing 2 comprises a series of spaced, vertical, fore and aft ribs that form cavities therebetween. These ribs comprise a pair of outer ribs 20 that constitute side walls for the housing 2, a central rib 21 of a slightly thicker cross-section than the other and intermediate ribs 22. Each of these ribs provide additional insulation between the various contact members and the terminals thereof. As stated previously, the housing 2 is mounted on the base frame 6 by means of mounting screws 9 inserted in mounting ears 23.

The central rib 21 is sub-divided into fore and aft sections and between these sections there is a manually operable, vertically movable plunger 24. The plunger 24 is inserted from the underside within a mating opening 25 in the contact housing 2 and upon insertion the spring 26 is inserted into the plunger 24 to retain it in place. The spring 26 holds the plunger 24 in a substantially raised position when no other forces are acting thereupon.

Figure 4:
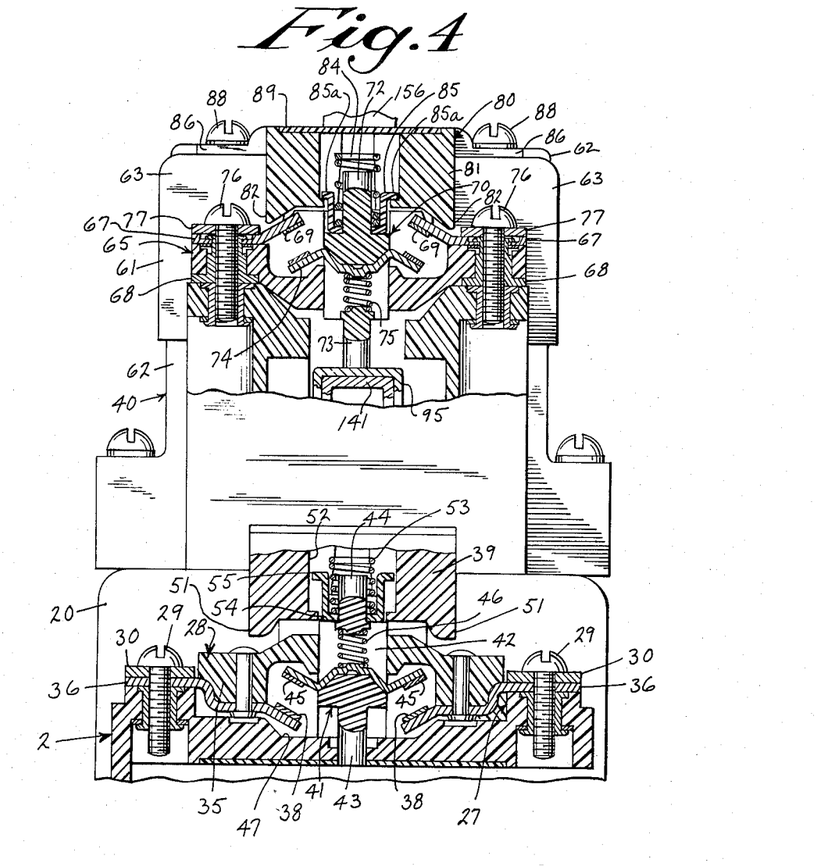
FIG. 4 is a sectional view taken along line 4—4 of FIG. 2 and illustrating the timer contact assembly and the instantaneous contact assembly in their respective normally-open positions.
Figure 5:
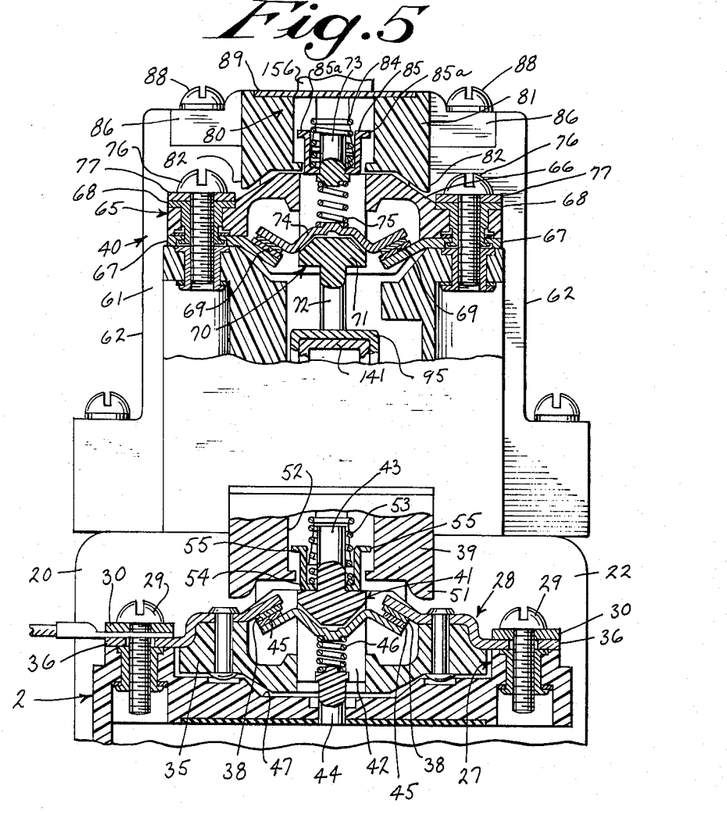
FIG. 5 is a sectional view taken along line 5—5 of FIG. 2 and illustrating the timer contact assembly and the instantaneous contact assembly in their respective normally-closed positions.
Figure 6:
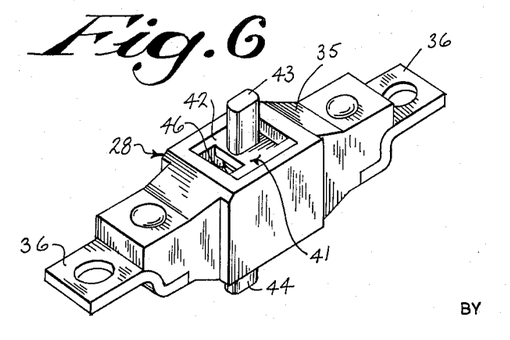
FIG. 6 is a perspective view of a contact assembly as used in the instantaneous contact portion of the relay of this embodiment.
Figure 18:
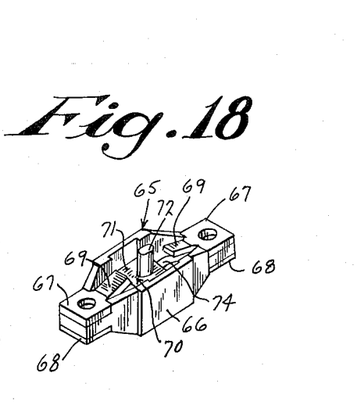
FIG. 18 is a perspective view of a contact module or assembly used in the time delay mechanism of the relay of the present invention.

The intermediate ribs 22 are also sub-divided into fore and aft portions, and they function to partition the housing 2 into a number of parallel adjacent cavities 27 that each receive an individual contact assembly 28, of a general configuration as best seen in the views of FIGS. 4–6. At each end of each cavity 27 there is a threaded terminal screw socket for receiving a terminal screw 29 for retaining the contact assemblies 28. The terminal screws 29 also function to clampingly engage lead wires (not shown) of an electrical circuit in cooperation with a wire retainer 30. The individual contact assemblies 28 are identical with one another, and except for slight modification are substantially identical to the contact assembly seated in the timer housing, as will later be described in connection with FIG. 18.

The contact assembly 28 (see FIGS. 4 and 5), which is arranged for instantaneous operation upon movement of the armature 5, responsive to energization of the coils 16, comprises a molded insulating body 35 with a hollow interior. A conductive terminal member 36 at each end receives a terminal screw 29 that mounts the assembly 28. The conductive terminal members 36 extend inwardly to terminate in stationary contacts 38 that are spaced from one another.

It will be noted that the view of FIG. 4 illustrates the contact assemblies 28 in normally-open position and that of FIG. 5 is illustrative of normally-closed contacts, said assemblies 28 being inverted relative to one another. It will also be apparent that assemblies of adjacent cavities 27 may also be inverted to the desired normal operating position, as desired, as each is mounted independently of the other. Such re-arrangement is easily brought about by removing the terminal screws 29 at each end of the assembly 28, after removal of a spring retainer, capping member 39. It will be obvious that the retainer member 39 may be removed upon removal of the timer assembly 40, as will hereinafter be described.

A hollow contact actuator 41 is received in each contact assembly 35 which has a box-like shape contact carrier 42 from which protrude vertical stems 43 and 44. A movable contact spanner 45 is inserted in each box-like central portion 42 for bridging the associated stationary contacts 38 and a contact spring 46 is inserted behind each spanner 45. Thus, when a contact assembly 28 is inserted in the normally-closed position of FIG. 5, the spring 46 holds the contacts closed when the relay parts are in normal position, and when a contact assembly 28 is inserted in normally-open position, as is shown in FIG. 4, the spring 46 will provide a closing force when the relay parts are moved into energized position.

Whether a contact assembly 28 is inserted in normally-open or normally-closed position, the lower stem 43 or 44 (as the case may be), will extend through the deck 47 of the contact housing 2 to rest upon the magnetic armature 5 or its side wing extensions 48. Thus, the actuators 41 are held in raised position in either inverted position, when the armature 5 is in its upward position relative to FIG. 1, against the bias of the springs 18.

The spring retainer 39 for the instantaneously operated contact housing 2 comprises a cap for this housing mounted independently of the timer housing 40 and is held in place by means of mounting screws 49 (see FIG. 1) in the central rib 21. The spring retainer 39 has a flat top 50 from which a set of four feet 51 depend. Each foot 51 is in line with a cavity 27 of the contact housing 2, for snug receipt therein and the lower parts of these feet surround the assemblies 28. In each foot 51 there is formed a spring well 52 that houses a spring 53 and a button 54. Each spring 53 has its upper end abutting an undercut shoulder of the top 50, and the bottom of each spring 53 works within its associated button 54, to urge the button 54 against the contact assembly 35 immediately below. The buttons 54 are retained in the assembly of the spring retainer, at the top 50 thereof, by means of outwardly extended flanges 55. The buttons are preferably molded of flexible insulating material such that the flanges can be deflected inwardly to permit insertion of the buttons from the bottom of the spring wells 52. The top 50 of the retainer 39 is formed with a central opening 56, through which the manually engageable plunger 24 protrudes (see FIG. 1). There is an aligning feature which is useful in keeping all of the complementary parts in order, and this is fully explained in the above-mentioned co-pending application.

The instantaneous contacts, as a part of the several contact assemblies 28 are motivated towards contact close or contact open position by the use of bias springs rather than a driving force provided directly from the magnet armature 5. The armature 5 is spring biased to its open position, and in this position the armature holds the contacts in their normal positions against opposing contact actuating springs. Thus, upon magnet energization the armature is retracted and the springs 46, 53 (depending upon relative inverted position of the assemblies 28 as respectively illustrated in FIGS. 4 and 15) actuate the contacts to their operated positions. Gravity and armature closing forces are thereby eliminated as actuating forces, and the relay can be mounted at any angle of repose.

It will be apparent that the manually operated plunger 24 may be operated downwardly against the bias of the magnet spring 18 to permit manual testing of each of the contact assemblies 28 without necessitating the energization of the coil 16. As will be explained below, such manually operating forces are transmitted to the plunger through the operating mechanism of the timer assembly 40. Thus, upon manual depression of the actuator 24, the armature 5 will be moved towards the yoke 4, permitting the operating springs 53 of the spring retainer 39 to act upon each of the contacts of the contact assembly 28, whether in the normally-closed or normally-open position, just as would be the case if the coil 16 were energized.

The timer assembly

Figure 12:
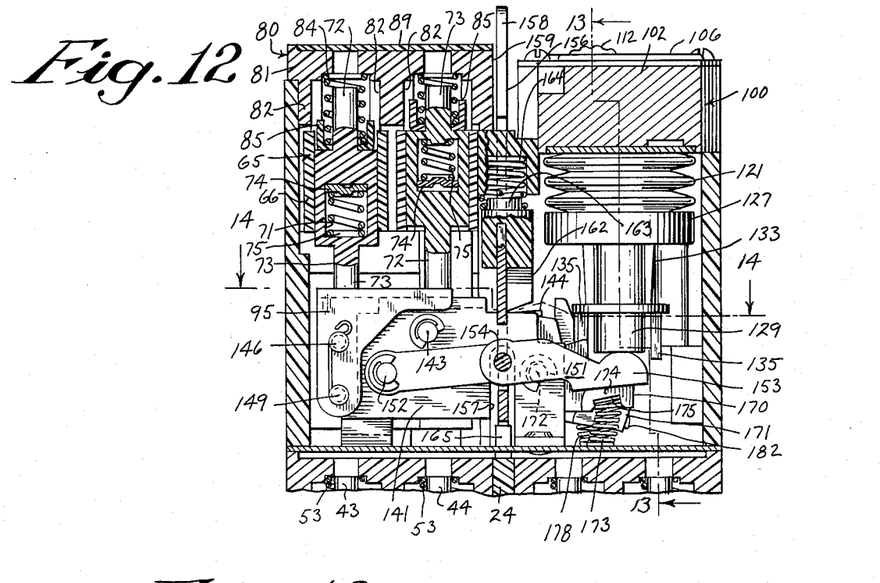
FIG. 12 is a sectional view taken along line 12—12 of FIG. 3, but only illustrating the timer unit of the relay comprising the uppermost section of the composite relay construction shown in FIG. 1, and with its various components arranged for "On Delay" operation.
Figure 20:
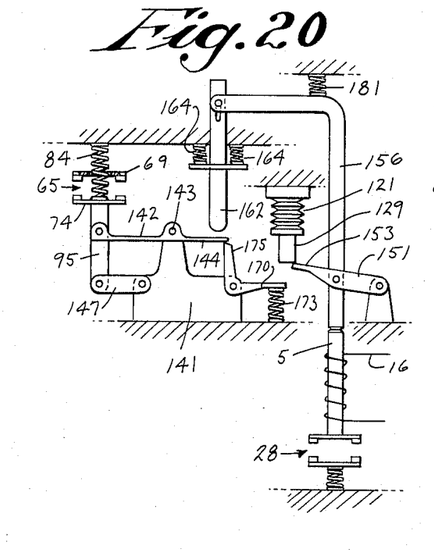
FIGS. 20–22, inclusive, are diagrammatic views illustrating the various components of the timer relay of the present invention, and the sequence of their operation when the bellows housing has been positioned for operation in the "On delay" position.
Figure 21:
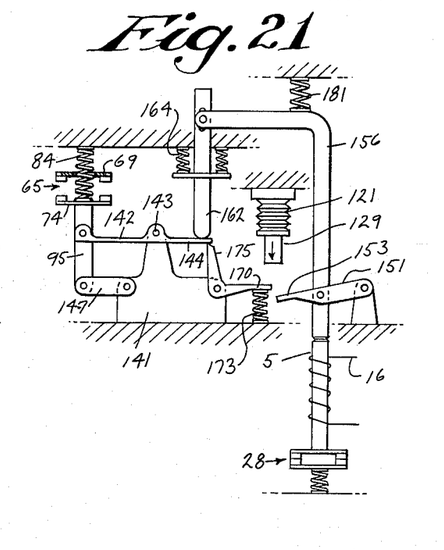
Figure 22:
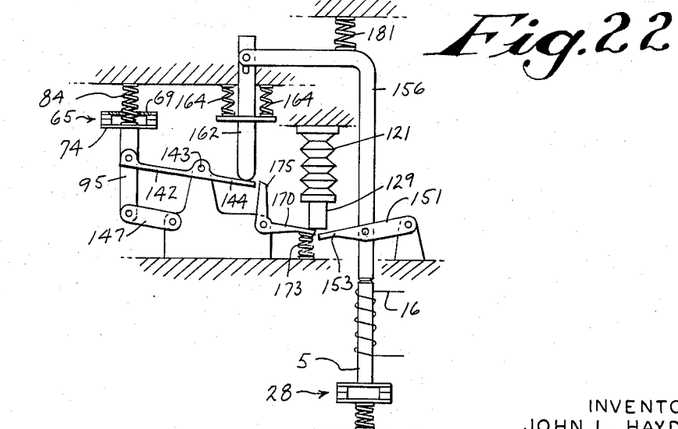
Figure 23:
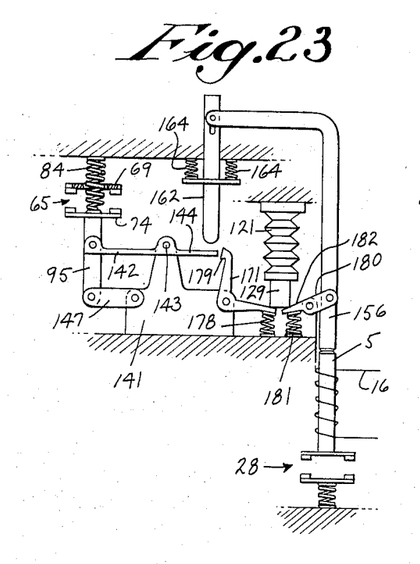
FIGS. 23–25, inclusive, are diagrammatic views illustrating the various components of the timer relay of the present invention and the sequence of their operation when the bellows housing has been positioned for operation in the "Off Delay" position in the timer unit.
Figure 24:
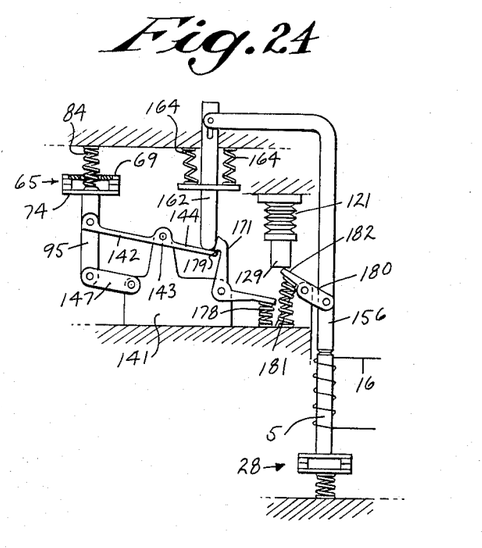
Figure 25:
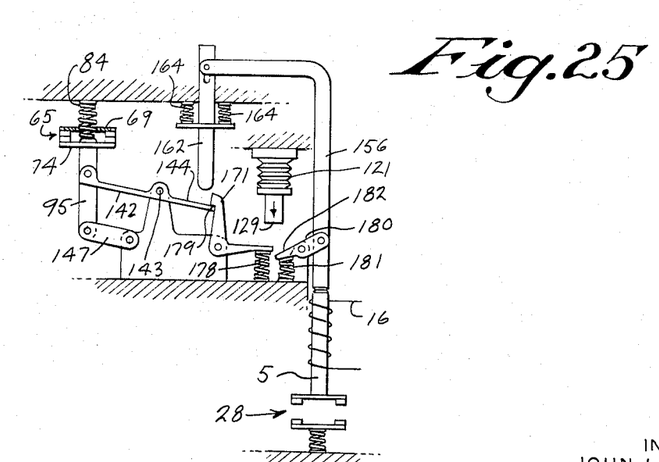

The component parts of the timer assembly 40 are illustrated in detail in FIGS. 8–14. As disclosed in these figures, the components are arranged for "On Delay" operation. However, as the description proceeds, it will be apparent that by simply reversing the position of the bellows housing end-for-end from that shown in FIG. 3 to the position shown in FIG. 7, an "Off Delay" operation may be obtained. The various components cooperating to provide the time delay actuation of the contacts are also shown diagrammatically in the views of FIGS. 20–25, inclusive. FIGS. 20–22 relate to the "On Delay" operation and FIGS. 23–25 are directed to the "Off Delay" operation. For purposes of simplicity in illustration, identical reference characters have been applied to the diagrammatic drawing components corresponding to the actual operating elements. The timer assembly 40 is provided with a molded insulating housing 61, the details of which may be observed in FIG. 8. It will be further observed that the housing contains vertical ribs 62, 63 and 64 defining, in this case, two cavities for receiving timer contact assemblies 65, more specifically detailed in FIGS. 4, 5 and 15, and which are operated in a manner very similar to that of the instantaneous contact assemblies or modules 28. The assemblies 65 have molded bodies 66 with terminal members 67. It will be noted that the assemblies 65 may be inverted relative to one another depending upon whether it is desired to have normally-open contact operation or normally-closed contact operation or with both assemblies in such operation position relative to one another. With reference to FIG. 12, and with the same assumption as specified heretofore that the device is in the de-energized state, the contact assembly 65 to the left (see also FIG. 4) is arranged for normally-open position and the adjacent contact assembly (see also FIG. 5) is arranged for normally-closed position. It will be obvious that, in either case, these contacts are being held in their initial operation position responsive to spring bias until a specified time delay has passed subsequent to the energization of the coils 16 ("On Delay") or subsequent to de-energization of previously energized coils 16 ("Off Delay") as will later be described.

Returning now to the details of the contact assembly 65, each terminal member 67 has a metal tab 68 on the reverse side so that electrical engagement may be made with a control circuit wire (not shown) for both positions of inversion of the assemblies 65. Also, each terminal 67 has a pair of oppositely spaced contacts 69. The molded bodies 66 receive contact actuators 70 with box-like contact carriers 71 and protruding stems 72, 73. Movable contact spanners 74 are inserted in each actuator 70 and contact springs 75 are also included in the assembly. It will be apparent with reference to FIG. 8 that the contact assemblies 65 are mounted in the desired operating position in a similar manner as the instantaneous contact assemblies 28. That is, the contact assemblies 65 are inserted in either of the relatively inverted positions within the cavity defined between the respective ribs 62, 63 and 63, 64 and are held in place by means of terminal screws 76 at either end thereof, which screws further include a wire retainer 77, the terminal screws 76 engaging tapped molding inserts (not shown) in the housing 61.

To complete the contact retaining portion of the housing 61, there is included a cover number 80 (specifically shown in FIG. 11), similar to the spring retainer member 39 of the instantaneous contact housing 2. The cover member 80 fits over the contact housing portion of the timer housing 61 to cap this housing in a manner similar to the capping of the instantaneous contact housing 2. For this purpose the cover 80 has a flat top 81 from which a set of two feet depend that are similar to the feet 51 of the member 39, each foot 81 is aligned with a cavity respectively defined by the ribs 62, 63 and 63, 64 for snug receipt therein.

A spring well 83 is formed in each foot 82 that houses a spring 84 and a button 85. The button is provided with an aperture for receiving either of the stems 72 or 73 depending upon the position of inversion of the contact assemblies 65. The spring 84 has its upper end abutting an undercut shoulder of the top 81 and the bottom end of each spring 84 works within its associated button 85 to urge the button 85 against the contact assembly 65 immediately below. The button 85 is held in place within the respective well 82 of the cover 80 by means of outwardly extending flanges 85a on the button 85 which snap within ears at the lower portion of each well. The cover 80 is provided with laterally extending ears 86 containing apertures 87 for receiving appropriate mounting screws 88 to hold the cover in position. A thin nameplate 89 is recessed in the top 81.

It will be apparent that the combined assembly of the cover 80 and the contact assemblies 65 contained within the housing 61 permits the springs 84 to provide an operating force against the movable contacts 74, via the contact carrier 71. The operating of the movable contacts 74 is prevented until a predetermined time delay has occurred responsive to operation of an engaging contact actuator 95 forming a part of the lever assembly which is indicated generally by the reference numeral 96. The stems 72, 73 rest upon the actuator 95 under the urging of the respective springs 84, depending upon the position of inversion of the assemblies 65. For the present, it may be stated that the actuator 95 will be moved upwardly relative to FIG. 12 after a predetermined time delay has transpired, at which time the time delay contact assemblies 65 will be operated.

The lever assembly 96 provides a general "parallelogram" arrangement of levers to achieve the desired function. It will be recalled that the views of FIGS. 10, 12–17, and diagrammatic views 20–22, inclusive, are illustrative of the construction and operation of the timer assembly 61 in the "On Delay" position. After it is understood, by means of illustration and description of the "On Delay" operation, the "Off Delay" operation will be readily explained by means of reference to the diagrammatic drawings of FIGS. 23–25 which explanation will be set forth hereinbelow.

Figure 3:
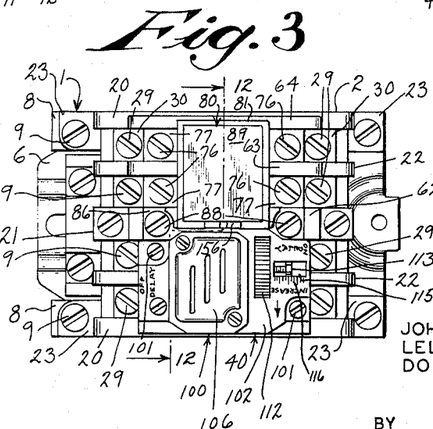
FIG. 3 is a top plan view of the relay illustrated in FIGS. 1 and 2, and with the bellows housing positioned in "On Delay" operating position.
Figures 7, 8, 9, 10, 11:
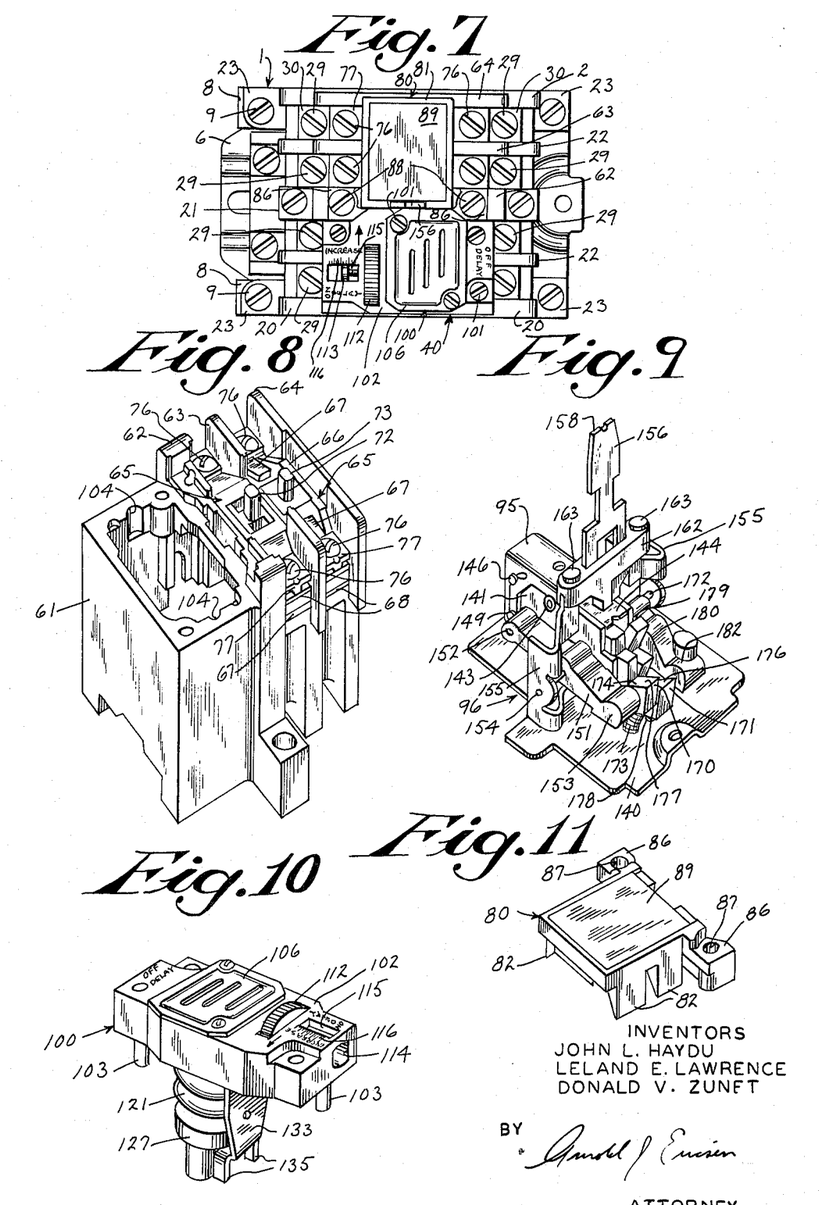
FIG. 7 is a top plan view of the timing relay of this invention similar to the view of FIG. 3, but with the exception that the bellows housing has been turned end-for-end to provide "Off Delay" operation.
FIG. 8 is a perspective view of the housing for the time delay unit of the present invention, and with parts removed to better illustrate the operating position of two contact assemblies and the arrangement of the internal chamber of the housing.
FIG. 9 is a perspective view of the operating lever assembly for the relay timer unit and illustrating the operating arrangement of the various levers and latches.
FIG. 10 is a perspective view of the bellows housing of the present relay timer.
FIG. 11 is a perspective view of the cover plate assembly for the timer contacts.

A bellows assembly 100 is shown in perspective view in FIG. 10 and as removed as a unit from the housing 61. The bellows assembly 100 as positioned in the "On Delay" position illustrated in the top plan view of FIG. 3, is retained in the housing 61 by means of mounting screws 101. The assembly 100 comprises a die cast valve housing 102 with downwardly depending studs 103 at either side thereof which are adapted to be received in re-entrant openings 104 in the timer assembly housing 61 (see FIG. 13). This assures that the valve housing will be in proper register for operation no matter in which operating position it may be placed relative to the housing 61.

Figure 13:
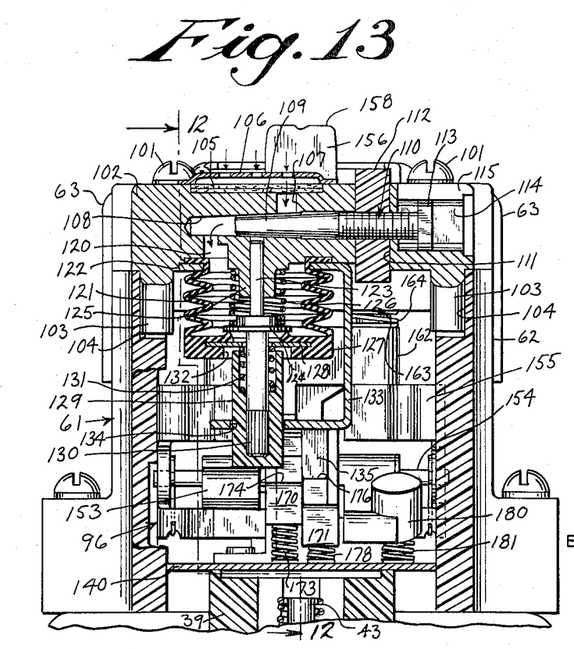
FIG. 13 is a sectional view taken along line 13—13 of FIG. 12.
Figure 14:
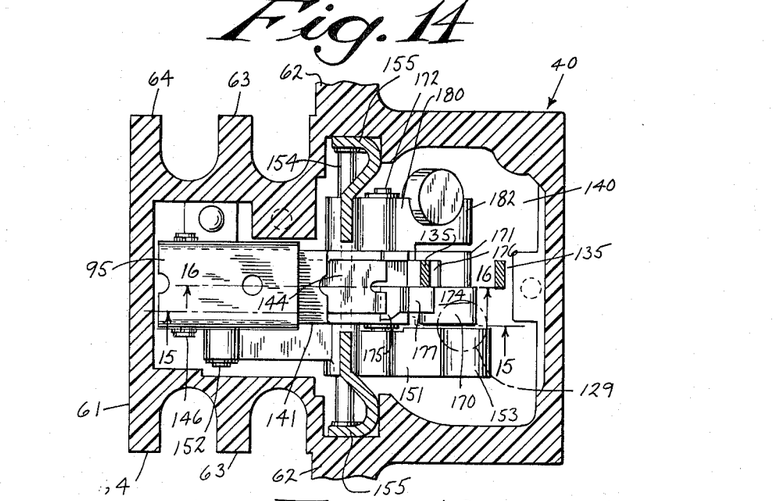
FIG. 14 is a sectional view taken along line 14—14 of FIG. 12.

With further reference to FIG. 13, it will be observed that the housing 102 is recessed at the top to receive air filter elements 105 which are protected by a thin apertured cover plate 106 held in place with appropriate mounting screws. As will be observed from FIG. 13, air enters from the filter elements 105 through an aperture 107 for passage into a longitudinal tapered chamber 108. Tapered chamber 108 is arranged to receive the tapered stem portion 109 of a threaded needle valve 110. The housing 102 is further provided with a transverse aperture 111 for receiving a valve adjusting thumb wheel 112 which is serrated around its circumference to permit manual rotation thereof. The wheel 112 is threaded at a central opening thereof to engage the threaded portion of the needle valve 110. The head 113 of the needle valve 110 has flat parallel sides which are engageable with an aperture 114 formed in the housing 102 and having similar flat parallel side walls, thereby to prevent the needle valve from rotating. The housing 102 is further apertured at 115 (see FIGS. 3 and 7) to provide a means for observing the head 113 of the needle valve relative to a scale 116 marked along one side of the aperture 115. As will be observed, an arrow is also marked on the top surface of the housing 102 near the scale 116 to indicate that by rotating the wheel 112 in the direction of the arrow, the time delay period may be increased, as will hereinafter be described.

The tapered chamber 108 further communicates at its terminal end with a transverse chamber 120, which in turn communicates with the interior of a flexible diaphragm, such as the bellows 121. The uppermost corrugation of the bellows 121 is retained within a recess in the housing 102 by means of a retaining plate 122 held in place by means of screws (not shown). Interiorly of the bellows 121 there is provided a shaft 123 slidable relative to the housing 102 and flanged at 124 intermediate its ends. The housing 102 is further formed with an apertured protuberance 125 communicating with the chamber 108 for slidably receiving the shaft, and which is further arranged at its exterior surface to seat a biasing coil spring 126 having its lower end bearing against the flange 124 to bias the shaft 23 downwardly relative to FIG. 13. The lower surface of the flange 124 abuts the base 127 of the bellows 121 to normally bias the bellows towards extended position and to serve as a valve seat for check valve purposes to be later described. The bellows base 127 is further reinforced by means of a washer-like element 128.

An actuator button 129 is provided at the lower end of the bellows and is force fitted to the lower end of the shaft 123 over the splines 130 on shaft 123. The upper end of the button 129 is provided with an enlarged chamber for receiving a check-valve spring 131. The upper end of the spring 131 bears against the washer-like element 128 and serves to bias the flange 124 of the shaft 123 against the base 127 of the bellows 121. It will be noted that the upper extremity of the button 129 is seated in an enlarged aperture 132 of the base 127, and is spaced from the surface of the aperture 132 and also the element 128 to provide a free passage of air between the element 128 and the shaft 123 for emission of air to the interior of the housing 61 upon depression of the bellows 123, and thereby act as a check valve.

Depending from the bellows retaining plate 122 is a hold-down bracket 133 which serves the dual function of guiding the button 129 in an axial direction through a loosely fitting aperture 134 in the inturned base portion of the bracket 133. The bracket 133 is also provided with opposed hold-down ears 135, the use of which will be explained in conjunction with the detailed description of the lever assembly 96.

Figure 15:
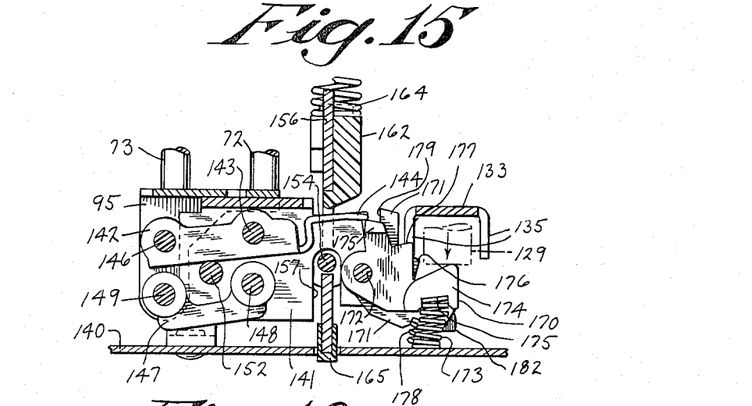
FIG. 15 is a sectional view of the lever assembly taken along line 15—15 of FIG. 14.
Figure 16:
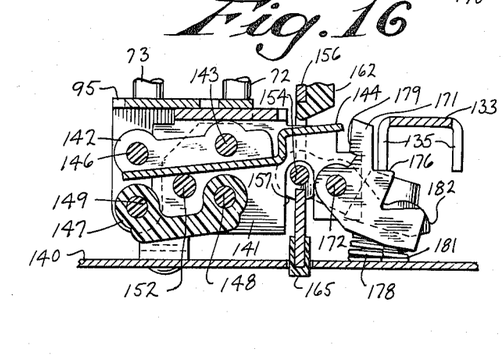
FIG. 16 is a sectional view of the lever assembly taken along line 16—16 of FIG. 14.
Figure 17:
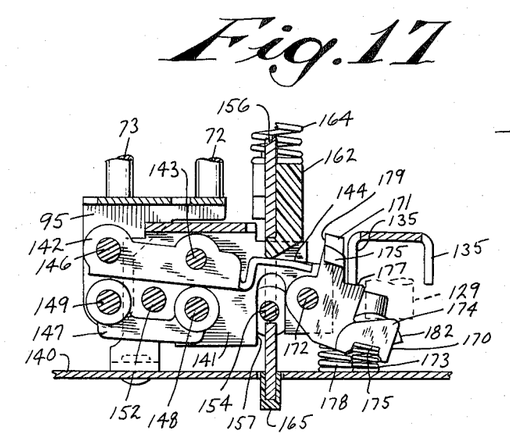
FIG. 17 is a sectional view of the lever assembly similar to the view of FIG. 15, but after the levers and latches have been actuated upon movement of the bellows to its operating position.

The contact actuating lever assembly 96 is illustrated in perspective in FIG. 9 and in detail in the various views of FIGS. 12–17. It is again repeated that these views illustrate the bellows assembly 100 acting upon the various elements of the lever assembly 96 to provide "On Delay" operation of the time delay contact assemblies 65. A stamped sheet metal base plate 140 provides a bottom cover for the time delay housing 61 and also serves to secure the various operating elements of the lever assembly. Riveted to the base plate 140 is an inverted channel-shaped supporting frame 141 which supports and houses (as shown in FIGS. 15–17, inclusive) an operating lever 142 pivoted to the supporting frame 141 intermediate its end by means of a transverse pivot pin 143. The distal end of the lever 142 terminates in a latching tongue 144, and the opposite end thereof is pivotally engaged at 146 with the previously mentioned contact actuator 95. It will be observed that the lever 142 is of a general inverted channel shape to provide a rigid construction.

Also within the channel of the supporting frame 141 there is included a linking lever 147, pivotally attached to the frame 141 at one end thereof, by means of transverse pivot pin 148, and at the opposite end thereof to the contact actuator 95 by means of the pivot pin 149. Thus, it will be observed that any motion imparted to the tongue portion 144 of the lever 142 will cause the "parallelogram" lever arrangement to lift the contact actuator 95 to rise upwardly relative to FIGS. 15–17, and as shown in FIG. 17, to actuate the operating elements of the contact assemblies 65 to their second operating position responsive to a predetermined time delay interval established by means of the bellows assembly 100.

An "On Delay" bellows actuating lever 151 (see FIGS. 12 and 14) is pivotally secured at one end thereof to a transverse pivot pin 152 in the supporting frame 141. Its distal end portion 153 (see FIG. 12) is arranged to engage the actuator button 129 extending from the bellows 121 when the bellows housing 102 is positioned on the "On Delay" position as shown. Intermediate the ends of the bellows actuating lever 151 there is inserted a pivot pin 154 rotatable relative to the lever 151 and fastened at opposite sides thereof to inturned flanges 155 of a movable drive plate 156. It will be noted that the movable plate is guided for vertical movement relative to FIGS. 12–17 by means of the slot 157 in the supporting frame 141 in addition to the fact that the upper end 158 thereof protrudes through an aperture 159 in the housing 61 and being loosely retained within an aperture of a latching lever actuator 162. The actuator 162 is of molded construction and contains spaced bosses 163 for seating the lower ends of bias springs 164, the upper ends of which are seated within and abut against reentrance openings in the housing 61. The lower end (relative to FIGS. 12–17) of the drive plate 156 is padded by means of a molded button 165 and normally bears against the top of the plunger 24 of the instantaneous contact assembly 2. However, if the device should take the form of a timing relay, without instantaneous contacts, it will be noted from FIG. 19 that the button bears against a plunger 166, the lower surface of which rests upon the movable armature 5. Thus, the only difference between the embodiments of FIGS. 1 and 2 and that of FIG. 19 lies in the provision of a supporting base 167 interposed between the magnet assembly 1 and the timer assembly 61. The base 167 is of insulating material.

It will now be apparent that the drive plate 156 is normally biased upwardly relative to FIGS. 12–17, the down or operate position being shown in FIG. 17. This upward bias under the urging of the magnet springs 18 bearing against the armature 5, causes the "On Delay" bellows actuating lever 151 to be raised to the position shown in 12 and 13. Such action, causes the bellows 121 to be preset for operation at such time as the drive plate is permitted to move downwardly either by manual pressure at the top end 158 thereof, or upon energization of the coil 16 to cause the armature 5 to move towards the yoke 4.

Also enclosed within the interior of the channel-shaped supporting member 141 are two adjacent latching levers, an "On Delay" latching lever 170 and an "Off Delay" latching lever 171, respectively. (See FIG. 13.) Both of these levers are pivotally mounted on the rigid support member 141 by means of a transverse pivot pin 172. In the normal operating position for the "On Delay" operation, the latching lever 170 is biased upwardly by the coil spring 173 bearing against its pad portion 174 from the underside thereof. The latching detent 175 normally rests beneath the tongue 144 of the latching lever 142 to hold the same upwardly and cause the lever 142 to rotate counterclockwise about its pivot 143 and retain the contact actuator 95 in the rest or non-operative position (see FIGS. 15 and 16).

Turning next to the lever assembly elements comprising the "Off Delay" operation, it will be apparent that the latching lever 171 is held entirely out of operation when the bellows housing 102 is positioned as shown in FIG. 13, by the fact that the ears 135 of the bracket 133 are pressing against the shoulder 176 to thereby cause the pawl 179 thereof (see FIG. 23) to be moved away from the tongue 144 of the lever 142. By merely removing the screws 101, the valve housing 102 may be removed from the timer housing 61 and rotated 180 degrees to the position shown in FIG. 7, whereby the ear 135 will then engage the shoulder 177 of the "On Delay" latching lever 170 to move it out of operation relative to the tongue 144, if so desired (not shown). It is to be further observed that an "Off Delay" bellows actuating lever 180 is provided and is pivotally attached to an extension of the pivot pin 172 supporting the latching levers 170 and 171, but supported from its inner end by means of pivot pin 154. In this case, the bellows actuating lever 180 is normally biased upwardly by means of a coil spring 181 mounted on the underside of the operating pad 182 of the lever 180. It should be further noted that spring 181 also serves to bias the drive plate 156 towards its normal operating position as shown in FIGS. 12 and 13. The case of "Off Delay" operation when the hold-down ears 135 of the bracket 133 are moved to the position of FIG. 7, they will bear against the shoulder 177 to thereby retain the lever 170 and prevent it from operating. The bellows will be normally distended with the stem 129 resting upon the pad 182, as will be described in connection with FIG. 23. In either case, the bellows actuating levers 153 and 180 will be free to operate without obstruction.

The operation of timing relay of the present invention is as follows:

Before specifically discussing the mode of operation with respect to FIGS. 20–25, respectively, a word should be mentioned about the operation of the instantaneous contact assemblies 28 of the relay. As previously mentioned, the timer mechanism of the relay of the present invention may be adapted for operation in combination with a relay disclosed and claimed in the above-mentioned co-pending application Serial No. 333,596. That is, the movable contacts of the instantaneous contact assemblies 28 and those of the timer contact assemblies 65 are not directly actuated by the force of the movable armature, as is true of prior art devices, but are each actuated by a respective bias spring seated in the spring retainer member 39 or in the timer cover member 80. The instantaneous contact assemblies 28 are restrained from operation by the force of the magnet springs 18 imparted to the movable armature 5, and thence to the respective abutting stem 43, 44 and from there to the body 35 which engages the spring button 54. Similar motion also occurs in the case of the timer contact assemblies 65, wherein the stem portions 72, 73 of the respective assemblies 65 rest upon the contact actuator 95 until the actuator is released responsive to timer operation as will hereinafter be described. It should be noted, however, that although the contact assemblies 28 and 65 are very similar in appearance and action, normally-open contact assembly 28 as used for instantaneous operation would be of inverted construction relative to a respective normally-open timer contact assembly 65 as respectively shown in the views of FIGS. 4 and 5.

Thus, in the case of the instantaneous contact assemblies 28, when the coil 16 is energized the armature 5 will be drawn towards the yoke 4 against the bias of the spring 8 to permit the various contact springs 46 of the spring retainer 49 to be expanded for operation of their respective contact assemblies for operation towards opening or closure of the contacts dependent upon their relative state of inversion.

As far as the timer contacts are concerned, their operation will be explained first in the case of "On Delay" operation with particular attention to FIGS. 20–22, inclusive, and to the detail illustrations of FIGS. 12–17, inclusive. As has been stated previously, the "Off Delay" operation which will be subsequently explained, and is readily achieved by mere reversal of the position of the valve housing 102 from the position of FIG. 3 to that of FIG. 7.

Assuming first the "On Delay" position with the coils 16 de-energized, and considering the timer contact assembly 65 to be in normally-open position (see FIG. 4), the drive plate 156 will be located in its uppermost position as shown in FIGS. 12–17, inclusive, and in the diagram of FIG. 20. It will be recalled that the drive plate 156 contacts the plunger 24 at its lower end via button 165, which plunger is normally biased upwardly as it rests upon the magnet armature 5, which is in turn normally biased upwardly by means of the springs 18. For purposes of illustration, there is diagrammatically shown in FIG. 20 a normally-open instantaneous contact assembly 28. As shown illustrated in FIGS. 20–22, energization of the coil 16 will cause the drive plate 156 to move downwardly relative to FIG. 20. This downward movement is caused in this instance by the joint action of gravity (although gravity is not a necessary force factor) and the bias of the spring 181 bearing against the underside of the pad 182 of the "Off Delay" bellows actuating lever 180. The latching lever 162 being mounted slidable relative to the drive plate 156 permits independent operation of the latching levers 170, 171 as will be later described.

Thus, with all parts being positioned in the relative operating relationship shown in FIG. 20, and with the coil 16 being de-energized, and with the relative parts of the diagrammatic drawing being numbered correspondingly to the parts shown in FIGS. 12–17, it will be observed that the bellows actuating lever 151 will have its distal end 153 moved upwardly because of its attachment to the upwardly urged drive plate 156. The actuator button of the bellows 129 will also have been thereby forced upwardly to compress the bellows 121. It will be further noted that the "On Delay" latching lever 170 will be in its detent engaging position under the influence of its bias spring 173, and with the tongue 144 of the latching lever 142 resting thereon. The first class lever 142 is arranged for parallel action with the pivot lever 147. In this case, it will be noted that the moveable contact spanner 74 of the contact assembly 65 will be in the normally-open position.

Assuming next that the coil 16 is energized to either open or close the instantaneous contact assemblies 28 (in the present discussion to close the normally-open contacts of the assembly 28), the drive plate 156 will be permitted to move downwardly relative to FIG. 21 under the influence of the spring 181 under the pad 182 of the lever 180. This action will also cause the bellows actuating lever 151 to be removed from contact with the button 129 of the bellows 121 and thus permit the bellows there to be expanded under the influence of bellows spring 126 operating against the flange 124 of the shaft 123 (see FIG. 13 for bellows detail). Depending upon the relative position of the tapered portion 109 of the needle valve 110 relative to the tapered chamber 108, air at a predetermined rate will be permitted to enter the chambers 108 and 120 to the interior of the bellows 121 to cause expansion of the bellows 121. Adjustment of the needle valve 110 may be made by means of rotating of the thumb wheel 112 to cause the threaded needle valve to move axially relative to the tapered chamber 108.

Assuming that the relay is mounted vertically as shown in FIGS. 1 and 2, and as will also be assumed in the diagrammatic views of FIGS. 20–22, the bellows will descend at the preset rate to engage the pad portion 174 of the latching lever 170 (see FIG. 14) to thereby cause the lever to move in the clockwise direction relative to FIGS. 20–22, and release the detent portion 55 from the tongue 144 of lever 142. At the moment that the drive plate 156 was permitted to descend, the latching lever actuator 162 also pressed downwardly against the tongue 144 by means of its bias springs 164. Thus, with the latching lever 170 out of the way, the tongue 144 and the lever 142 will be pivoted about its pivot pin fulcrum 143 to cause the contact actuator 95 to rise under the urging of the springs 164 acting upon the actuator 162. This will move the normally-open contact spanner 74 of the assembly 65 towards engagement with the stationary contacts 69. The opposite is true when the contact assembly 65 has been inverted for normally-closed position as shown in FIG. 5. A review of the various positions of the levers of FIGS. 12, 15–17 will also indicate the action of the various components which have just been described in connection with the diagrammatic drawings of FIGS. 20–22.

When the coil is de-energized, the timer contact drive plate 156 will rise causing the levers 142, 147 and 95 to resume their original position as shown in FIGS. 12 and 20. As the plate 156 rises, it will also cause the latching lever actuator 162 to be released from the tongue 144 sufficiently to permit the detent 175 to be moved beneath the tongue 144 under the influence of its bias spring 173. The springs 84 contained in the spring wells 83 of the top 81 provide sufficient bias to permit all levers to return to their normal operating position, as shown in FIG. 17, with the tongue 144 of lever 142 resting upon the detent 175 of the "On Delay" latching lever 170. The bellows 121 will be compressed upwardly by the action of the lever 151 to its normal "On Delay" operating position. As previously mentioned, a check valve has been described in connection with the view of FIG. 13 and comprises the interaction of the bottom surface of the flange portion 125 of the shaft 123 resting upon the base 127, and which is biased towards closure by means of the spring 131 contained in the chamber of the button 129. Upward pressure on the button 129 releases the seal and permits air to be expelled through the aperture 132 of the bellows base 127.

Referring next to the "Off Delay" operation of the timer relay, it will be observed from FIGS. 23 through 25 that the same basic components are utilized to accomplish this function with the exception that the valve housing 120 is reversed from the position shown in FIG. 3 to that of FIG. 7, to thereby cause hold-down ears 135 on the bracket 133 to be removed from contact with the shoulder 176 of the "Off Delay" latching lever 171 and permit this lever to function under the influence of the spring 178. In this case, although not specifically shown, the hold-down ears 135 are then disposed to rest upon the shoulder 177 of the "On Delay" latching lever 170, and the button 129 of the bellows shaft 123 will then be oriented to align with the pad 182 of the lever 180 for actuating therewith.

The various elements which cooperate with one another to provide the "Off Delay" function are shown diagrammatically in their relative operating position in FIG. 23. Here again, it is for purposes of illustration that both the contact assemblies 28 and 65 are in normally-open inverted position (see FIG. 4). The drive plate 156 is in its upward position against the bias of the spring 181 pressing against the bellows actuating lever 180. The bellows 121 is in its normally distended position responsive to the action of its internal spring 26 (see FIG. 13) with its button 129 resting on the pad 182 of the lever 180 and also pressing against the distal end of the "Off Delay" latching lever 171. The pawl 176 of the lever 171 will thereby be withdrawn from the upper surface of the tongue 144 of the lever 142. The latching lever spring 178 will be compressed, thus urging the lever 171 in a counter-clockwise direction relative to FIG. 23. This permits the normally-open contact assembly 65 to remain in its open position as shown.

Upon energization of the coils 16, as shown in FIG. 24, both the instantaneous normally-open contact assemblies 28 and the normally-open time delay contact assembly 65 are immediately caused to be moved to their operating position. In the case of the normally-open contact, the contacts are closed, and in the case of the normally-closed contact assemblies, the contacts will be instantaneously opened upon energization of the coils 16. The reason for this is that the drive plate 156 is permitted to descend under the influence of the biasing spring 181 acting against the lever 180. The springs 164 urge the latching lever actuator 162 downwardly relative to FIG. 24 to depress the tongue portion of the lever 142 and cause the lever 142 to rotate in clockwise direction about its fulcrum 143. Such clockwise motion will cause the movable contact spanner 74 to engage the stationary contacts 69 of the contact assembly 65. It will be further noted that the bellows 121 will be caused to contract as the bellows actuating lever 180 is rotated in a clockwise direction about its fulcrum with its pad 153 pressing against the button 129 of the bellows 121. As long as the coil 16 remains energized, the time delay assemblies will be actuated to their operating position (in this case from a normally-open position to a normally-closed position).

The "Off Delay" function of the timer is now set to begin. That is, when the circuit is broken and the coil 16 is de-energized to either return the instantaneous contact assemblies 28 to their normal operating position, or to merely act as a means of operating a time delay relay comprising contacts 65, as detailed in FIG. 19, the drive plate 156 will be returned to its normal operating position as shown in FIGS. 23 and 25 under the influence of springs 18 bearing against the armature 5. This action will cause the bellows actuating lever 180 to withdraw its distal end portion 182 away from the pushbutton 129 of the compressed bellows 121, as shown diagrammatically in FIG. 25, to thus permit the bellows 121 to descend in accordance with the pre-adjusted rate as previously described in connection with the "On Delay" arrangement. In this case, the bellows pushbutton 129 will descend to contact the shoulder 176 of the latch lever 171, which has previously been engaged with tongue 144 by means of the pawl 179. Thus, the normally-open contacts of the contact assemblies 65 will remain closed until the bellows pushbutton 129 forces the pawl 179 away from the lever 144 against the bias of the spring 178 to release the lever in a trigger-like fashion to either open the normally-open contacts or close the normally-closed contacts (not shown) at a predetermined time after the coil 16 has been de-energized. The various cooperating elements will then be returned to the respective position shown in FIG. 23. This action is accomplished in both the "On Delay" and the "Off Delay" arrangements by means of the parallelogram arrangement of the levers 142, 95 and 147, levers 142 and 147 being pivoted to the stationary support 141 at points equidistant with the pivot attachment points of the lever 95.

It will be apparent that improved timer relay has been provided by the present invention, which relay provides a convenient means of easily converting the relay from "Off Delay" to "On Delay" operating position and vice versa without necessitating removal and rearrangement of levers, and which relay also permits simple inversion of contact assemblies to permit a normally-open or normally-closed arrangement of either or both of said assemblies.

We claim:

1. In a timer relay assembly comprising a contact assembly having a stationary contact, and a movable contact, and spring bias means adapted to urge said movable contact from a first operating position to a second operating position relative to said stationary contact, and an electromagnetic actuator including a coil and a magnetic plunger movable responsive to energization of said coil; the combination therewith of a lever assembly including a stationary support, a contact actuator presenting an operating arm and arranged for moving said movable contact from said first to said second operating position, a first class lever pivotally mounted intermediate its ends on said stationary support and having one end pivotally connected to said actuator arm and its opposite end providing a latching tongue, and a linking lever having one end pivotally connected to said actuator arm and the opposite end thereof pivotally connected to said stationary support, the pivot points of said linking lever being spaced from those of said first class lever to establish a locus defining a parallelogram; plunger actuated, lever means adapted to reset said time delay means; a pair of latching levers, each of said latching levers being respectively biased towards engagement with said latching tongue, and each being further arranged to be held away from latching relationship with said tongue while the other of said pair is free to operate; and a plunger operated, latching lever actuator biased towards contact with said latching tongue and consequent rotation of said first class lever for operation thereof and motivation of said movable contact by means of said contact actuator; and regulable, pneumatically operated, time delay means adapted to alternatively actuate a free latching lever towards disengagement with the latching tongue at the expiration of a preset time delay period for actuation of said movable contact towards its second operating position.

2. In a timer relay assembly comprising a contact assembly having a stationary contact, and a movable contact, and spring bias means adapted to urge said movable contact from a first operating position to a second operating position relative to said stationary contact, and an electromagnetic actuator including a coil and a magnetic plunger movable responsive to energization of said coil; the combination therewith of a lever assembly including a stationary support, a contact actuator presenting an operating arm and arranged for moving said movable contact from said first to said second operating position, a first class lever pivotally mounted intermediate its ends on said stationary support and having one end pivotally connected with an arm of said actuator and its opposite end providing a latching tongue and a linking lever having one end pivotally connected to said actuator arm and the opposite end thereof pivotally connected to said stationary support; a regulable time delay means comprising a removable, reversible housing including an expansible-contractible diaphragm, said housing further including hold-down means; plunger actuated, lever means adapted to reset said diaphragm to its contracted state; a pair of latching levers, each of said latching levers being respectively biased towards engagement with said latching tongue, the hold-down means of said housing being arranged to alternatively engage a respective latching lever to hold the same away from latching relationship with said tongue while the other of said pair is free to operate; and a plunger operated latching lever actuator biased towards contact with said latching tongue and rotation of said first class lever for operation thereof; said time delay means being adapted to actuate the free latching lever towards disengagement with the latching tongue at the expiration of a preset time delay period.

3. A timer relay assembly arranged for alternatively providing either an "On Delay" or an "Off Delay" operation of a contact assembly, and comprising in combination: a contact assembly including a stationary contact and a movable contact; an electromagnetic actuator including a coil, a magnetic yoke, a magnetic armature movable responsive to energization of said coil; contact operating means responsive to the operation of said armature for operating said movable contact from a first operating position to a second operating position relative to said stationary contact; "On Delay" latching means for releasably latching said contact operating means to thereby prevent said last mentioned means from operating said movable contact until a pre-established "On Delay" period has transpired subsequent to operation of said armature responsive to energization of said coil; "Off Delay" latching means for releasably latching said contact operating means to thereby prevent said last mentioned means from operating said movable contact until a pre-established "Off Delay" period has transpired subsequent to operation of said armature responsive to de-energization of said coil and after said coil has been energized; retraining means arranged for alternatively restraining a respective one of said latching means from functioning to latch with said contact operating means; regulable time delay means adapted to alternatively provide said pre-established "On Delay" and "Off Delay" periods; "On Delay" reset means arranged to reset said time delay means responsive to operation of said armature subsequent to de-energization of said coil; "Off Delay" reset means arranged to reset said time delay means responsive to operation of said armature upon energization of said coil; and an armature controlled, spring biased operator arranged to actuate said contact operating means upon movement of said armature responsive to energization of said coil and after a respective unrestrained one of said latching means has been released from latching relationship with said contact operating means to thereby motivate said contact operating means for alternatively operating said movable contact in either an "On Delay" or an "Off Delay" operation relative to movement of said armature.

4. A timer relay assembly arranged for alternatively providing either an "On Delay" or an "Off Delay" operation of a contact assembly, and comprising in combination: a contact assembly including a stationary contact and a movable contact; an electromagnetic actuator including a coil, a magnetic yoke, a magnetic armature movable responsive to energization of said coil, and a spring normally biasing said armature away from said yoke upon de-energization of said coil; a movable contact actuator; armature actuated operating means for said movable contact comprising a first class actuator lever pivotally supported intermediate its ends, and having one end arranged for moving said contact actuator toward operation of said contact assembly, the opposite end of said lever terminating in a latching tongue; an "On Delay" latching lever arranged to normally engage the tongue of said actuator lever to prevent the lever from rotating to operate said contact actuator until a pre-established "On Delay" period has transpired subsequent to operation of said armature responsive to energization of said coil; an "Off Delay" latching lever arranged to normally engage the tongue of said actuator lever to prevent the lever from rotating to operate said contact actuator until a pre-established "Off Delay" period has transpired subsequent to operation of said armature responsive to de-energization of said coil and after said coil has been energized; hold-down means arranged for alternatively restraining a respective one of said latching levers from functioning to latch with said latching tongue; regulable time delay means comprising a contractible-expansible element arranged to engage with said latching levers for release of said levers from said latching tongue upon expiration of a regulated time period; an "On Delay" armature actuated lever arranged to engage said conrtactible-expansible element for normally contracting the same responsive to spring biased operation of said armature subsequent to de-energization of said coil; an "Off Delay" armature actuated lever arranged to engage said contractible-expansible element for contracting the same responsive to operation of said armature upon energization of said coil and to release said element for expansion thereof subsequent to de-energization of said coil and spring biased operation of said armature; and an armature controlled, spring biased operator arranged to engage and to depress the latching tongue end portion of said actuator lever upon movement of said armature responsive to energization of said coil and after a respective unrestrained one of said latching levers has been removed from engagement with said latching tongue to thereby motivate said contract actuator lever for alternatively operating said movable contact in either an "On Delay" or an "Off Delay" operation relative to movement of said armature.

5. A timer relay assembly arranged for alternatively providing either an "On Delay" or an "Off Delay" operation of a contact assembly, and comprising in combination: a time delay contact assembly including a stationary contact and a movable contact; an electromagnetic actuator including a coil, a magnetic yoke, a magnetic armature movable responsive to energization of said coil, and a spring normally biasing said armature away from said yoke upon de-energization of said coil; an instantaneous contact assembly including a stationary contact and a movable contact, said movable contact being arranged for movement towards and away from engagmeent with said stationary contact concurrently with the movement of said armature; a movable contact actuator; armature actuated operating means for said movable contact comprising a first class actuator lever pivotally supported intermediate its ends, and having one end arranged for moving said contact actuator toward operation of said contact assembly, the opposite end of said lever terminating in a latching tongue; an "On Delay" latching lever arranged to normally engage the tongue of said actuator lever to prevent the lever from rotating to operate said contact actuator until a pre-established "On Delay" period has transpired subsequent to operation of said armature responsive to energization of said coil; an "Off Delay" latching lever arranged to normally engage the tongue of said actuator lever to prevent the lever from rotating to operate said contact acutator until a pre-established "Off Delay" period has transpired subsequent to operation of said armature responsive to de-energization of said coil and after said coil has been energized; hold-down means arranged for alternatively restraining a respective one of said latching levers from functioning to latch with said latching tongue; regulable time delay means comprising a contractible-expansible element arranged to engage with said latching levers for release of said levers from said latching tongue upon expiration of a regulated time period; an "On Delay" armature actuated lever arranged to engage said contractible-expansible element for normally contracting the same responsive to spring biased operation of said armature subsequent to de-energization of said coil; an "Off Delay" armature actuated lever arranged to engage said contractible-expansible element for contracting the same responsive to operation of said armature upon energization of said coil and to release said element for expansion thereof subsequent to de-energization of said coil and spring biased operation of said armature; and an armature controlled, spring biased operator arranged to engage and to depress the latching tongue end portion of said actuator lever upon movement of said armature responsive to energization of said coil and after a respective unrestrained one of said latching levers has been removed from engagement with said latching tongue to thereby motivate said contact actuator lever for alternatively operating said movable contact in either an "On Delay" or an "Off Delay" operation relative to movement of said armature.

6. A time delay device arranged for alternatively providing either an "On Delay" or an "Off Delay" operation of a contact assembly, and comprising in combination: a contact assembly including a stationary contact and a movable contact; spring biased actuating means having a first and a sceond actuating position; contact operating means responsive to the operation of said actuating means for operating said movable contact from a first operating position to a second operating position relative its second actuating position; "Off Delay" latching means for releasably latching said contact operating means and thereby prevent said last-mentioned means from operating said movable contact until a pre-established "On Delay" period has transpired subsequent to actuation of said actuating means from its first actuating position to its second actuating position; "Off Delay" lacthing means for releasably latching said contact operating means to thereby prevent said last-mentioned means from operating said movable contact until a pre-established "Off Delay" period subsequent to return of said actuating means to its first operating position after having been actuated to its second operating position; restraining means for alternativley restraining a respective one of said latching means from functioning to latch with said contact operating means; regulable time delay means adapted to alternately provide said pre-established "On Delay" and "Off Delay" periods; "On Delay" reset means arranged to reset said time delay means responsive to actuation of said actuating means subsequent to "On Delay" operation of said contact operating means and return of said actuating means from its second actuating position to its first operating position; "Off Delay" reset means arranged to reset said time delay means responsive to actuation of said actuating means from its first actuating position to its second actuating position.

References Cited by the Examiner
UNITED STATES PATENTS 3,019,317   1/1962   Gauvreau ___________ 200—108

BERNARD A. GILHEANY, *Primary Examiner.*

R. N. ENVALL, JR., *Assistant Examiner.*